(12) United States Patent
Castanos et al.

(10) Patent No.: US 9,840,332 B2
(45) Date of Patent: Dec. 12, 2017

(54) DEPLOYABLE DOOR-MOUNTED SEAT

(71) Applicant: The Boeing Company, Chicago, IL (US)

(72) Inventors: Carmen J. Castanos, Cambridge, MA (US); Hugh A. Starks, Sequim, WA (US); Jeffrey R. Nix, Everett, WA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 14/884,661

(22) Filed: Oct. 15, 2015

(65) Prior Publication Data
US 2017/0106983 A1  Apr. 20, 2017

(51) Int. Cl.
  *B64D 11/06* (2006.01)
  *B64C 1/14* (2006.01)
  *B64D 11/02* (2006.01)
(52) U.S. Cl.
  CPC ........ *B64D 11/0691* (2014.12); *B64C 1/1423* (2013.01); *B64D 11/02* (2013.01)
(58) Field of Classification Search
  CPC .................................................. B64D 11/0691
  See application file for complete search history.

(56) References Cited

U.S. PATENT DOCUMENTS

| | | | | |
|---|---|---|---|---|
| 6,079,669 A * | 6/2000 | Hanay | ................ | B64D 11/0691 244/118.5 |
| 2013/0206905 A1 | 8/2013 | Savian et al. | | |
| 2013/0206906 A1 | 8/2013 | Burrows et al. | | |
| 2014/0209741 A1 * | 7/2014 | Boenning | ............... | B64D 11/06 244/118.6 |
| 2015/0084391 A1 * | 3/2015 | Schliwa | ............. | B64D 11/0691 297/344.1 |
| 2016/0355266 A1 * | 12/2016 | Seibt | ....................... | B64D 11/02 |
| 2017/0129612 A1 * | 5/2017 | Seibt | .................. | B64D 11/0691 |

FOREIGN PATENT DOCUMENTS

WO   WO2015124794   8/2015

OTHER PUBLICATIONS

European Search Report, Application No. 16193733.9, dated Feb. 2, 2017.
Runway Girl Network, "Airline reveals its concerns about new Airbus lavatory/galley option," dated Aug. 16, 2015, available at <http://www.runwaygirlnetwork.com/2015/08/16/airline-reveals-its-concerns-about-new-airbus-lavatorygalley-option/>, last accessed Oct. 15, 2015.

* cited by examiner

*Primary Examiner* — Richard G Davis

(57) ABSTRACT

A seat system may include a door and a locking mechanism. The door may be movable between an open position and a closed position. The seat system may include a seat mounted to the door and including a seat bottom that may be movable between a stowed position and a deployed position. The seat system may further include a locking mechanism operatively coupled to the seat bottom and configured such that movement of the seat bottom from the stowed position to the deployed position when the door is in the closed position causes the locking mechanism to engage fixed door-frame structure located adjacent the door and to immobilize the door against movement from the closed position. Movement of the seat bottom from the deployed position to the stowed position may cause the locking mechanism to disengage from the fixed door-frame structure and to allow the door to be moved from the closed position.

20 Claims, 12 Drawing Sheets

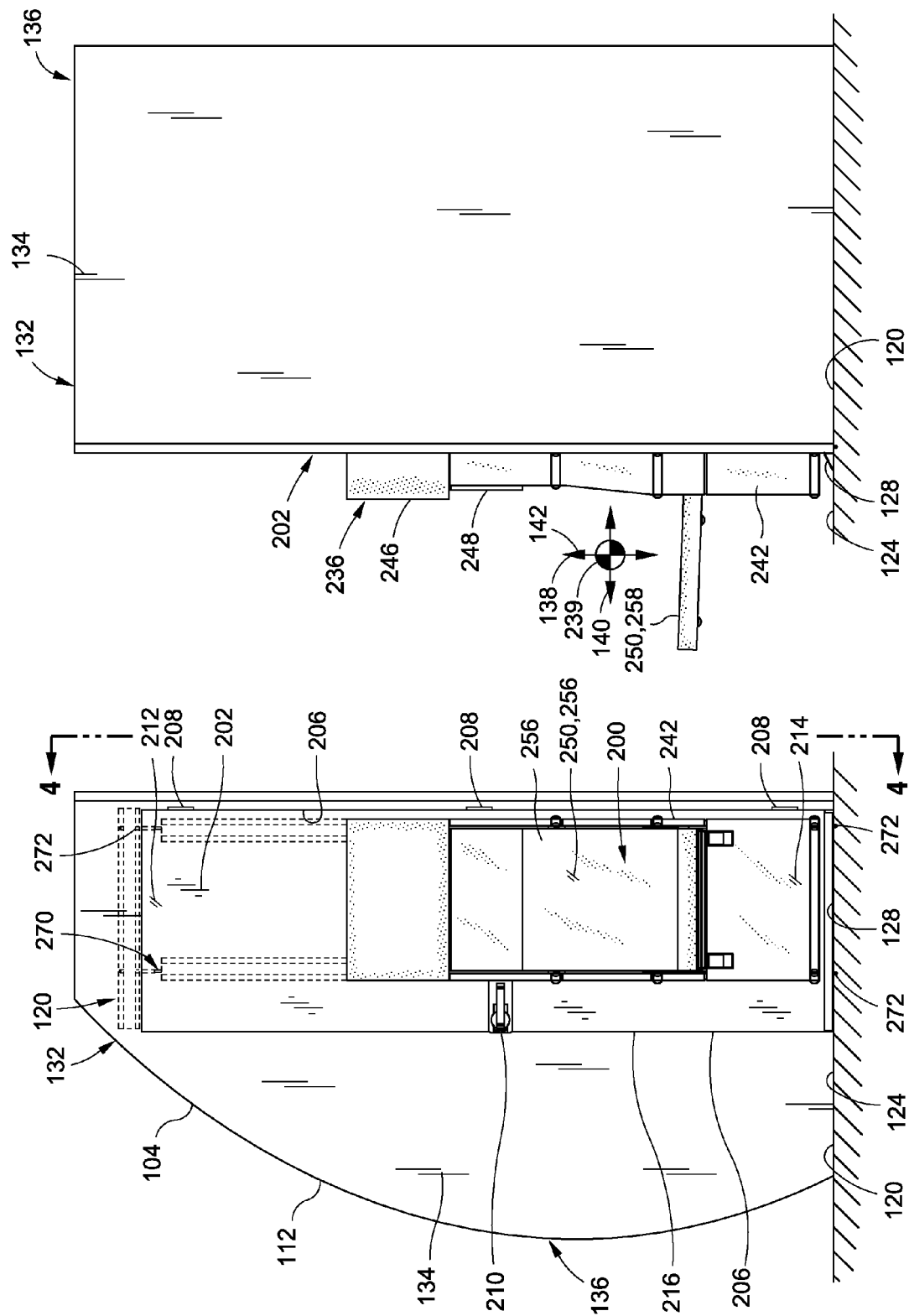

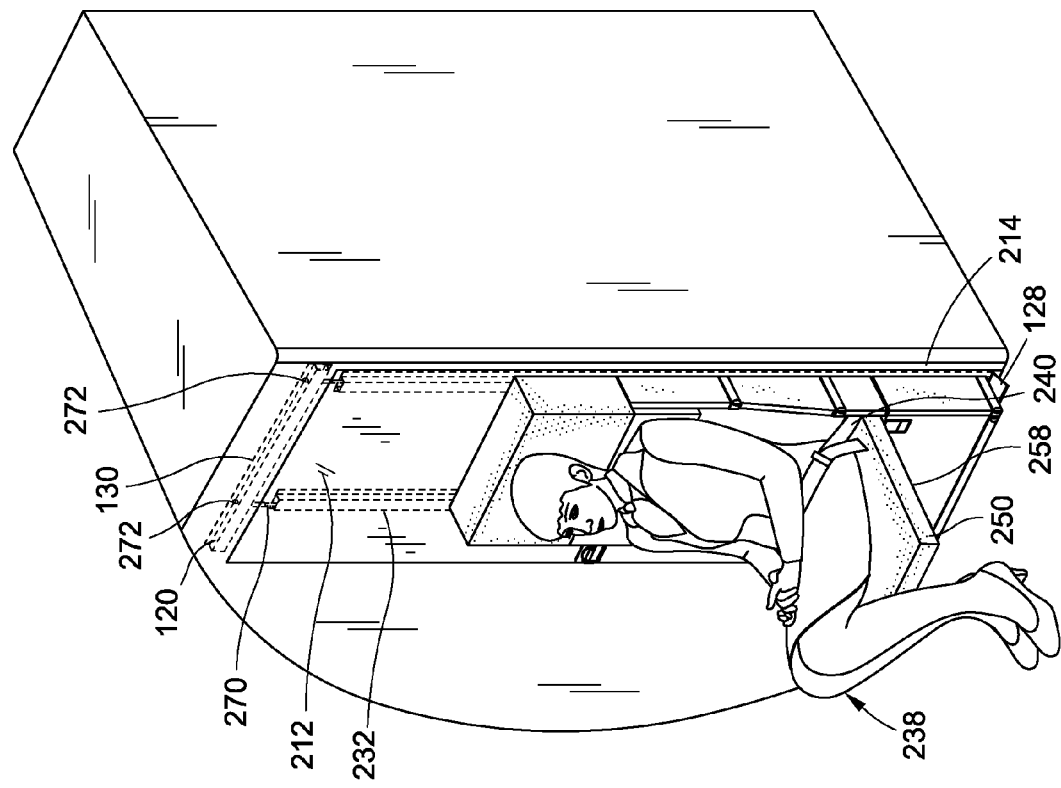
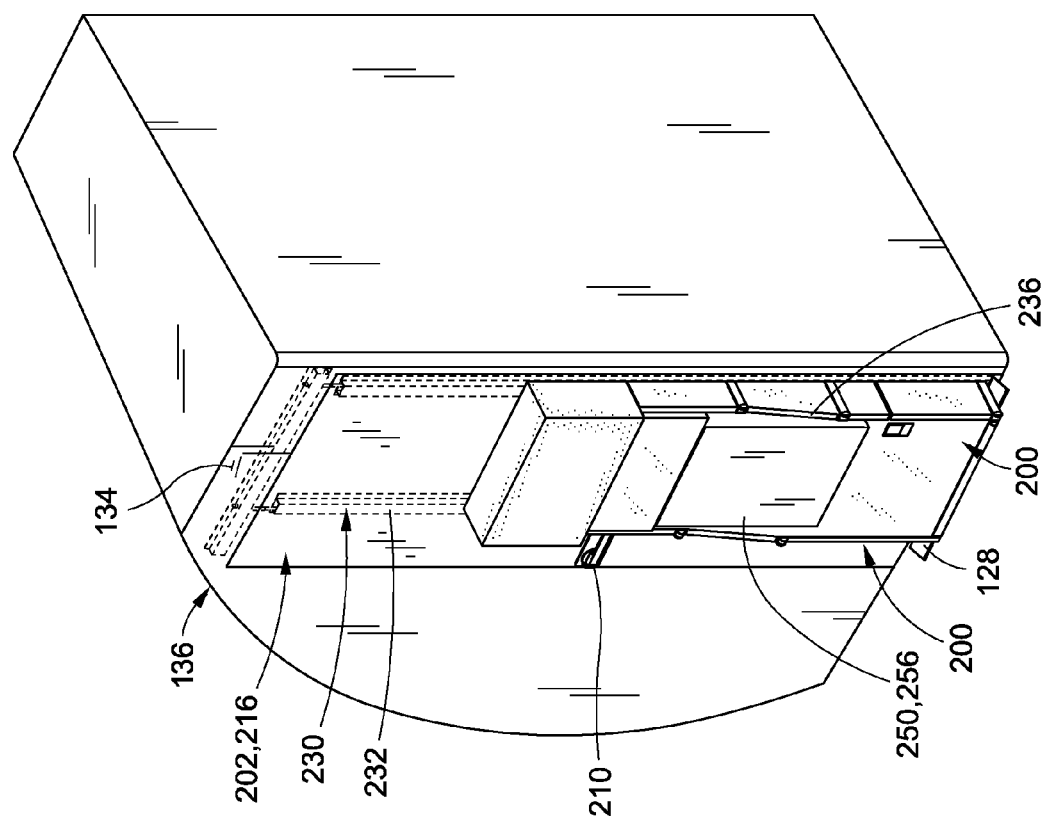

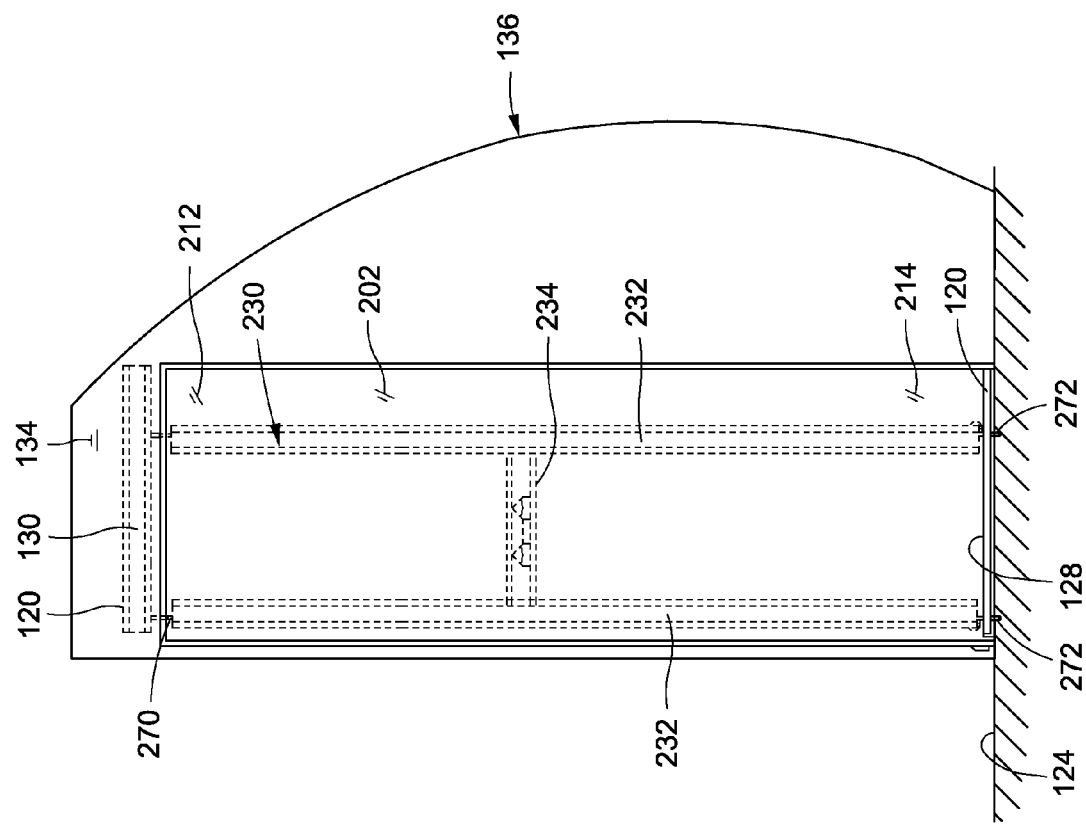
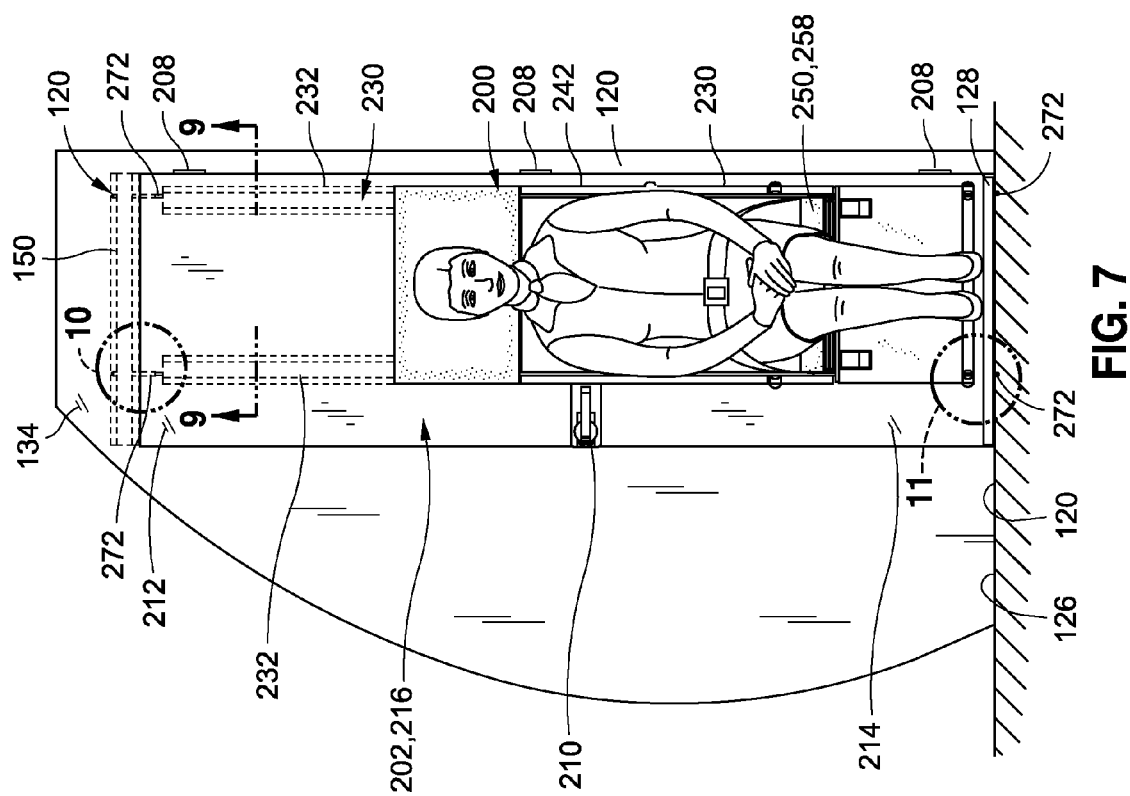

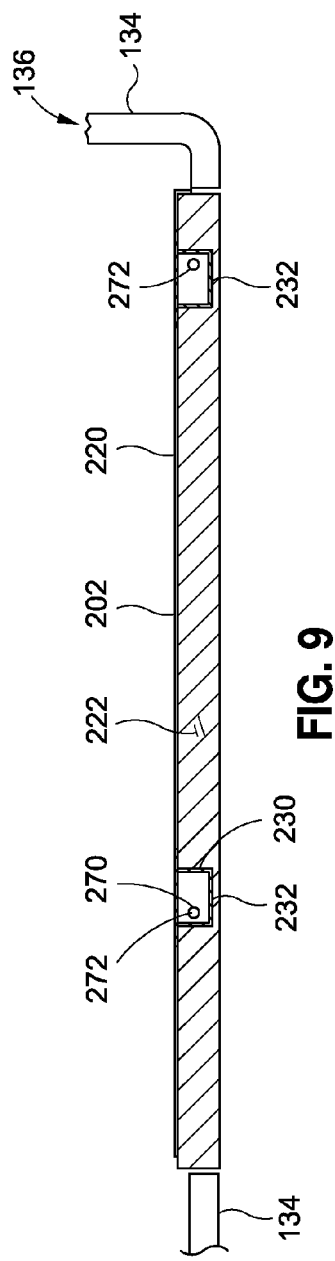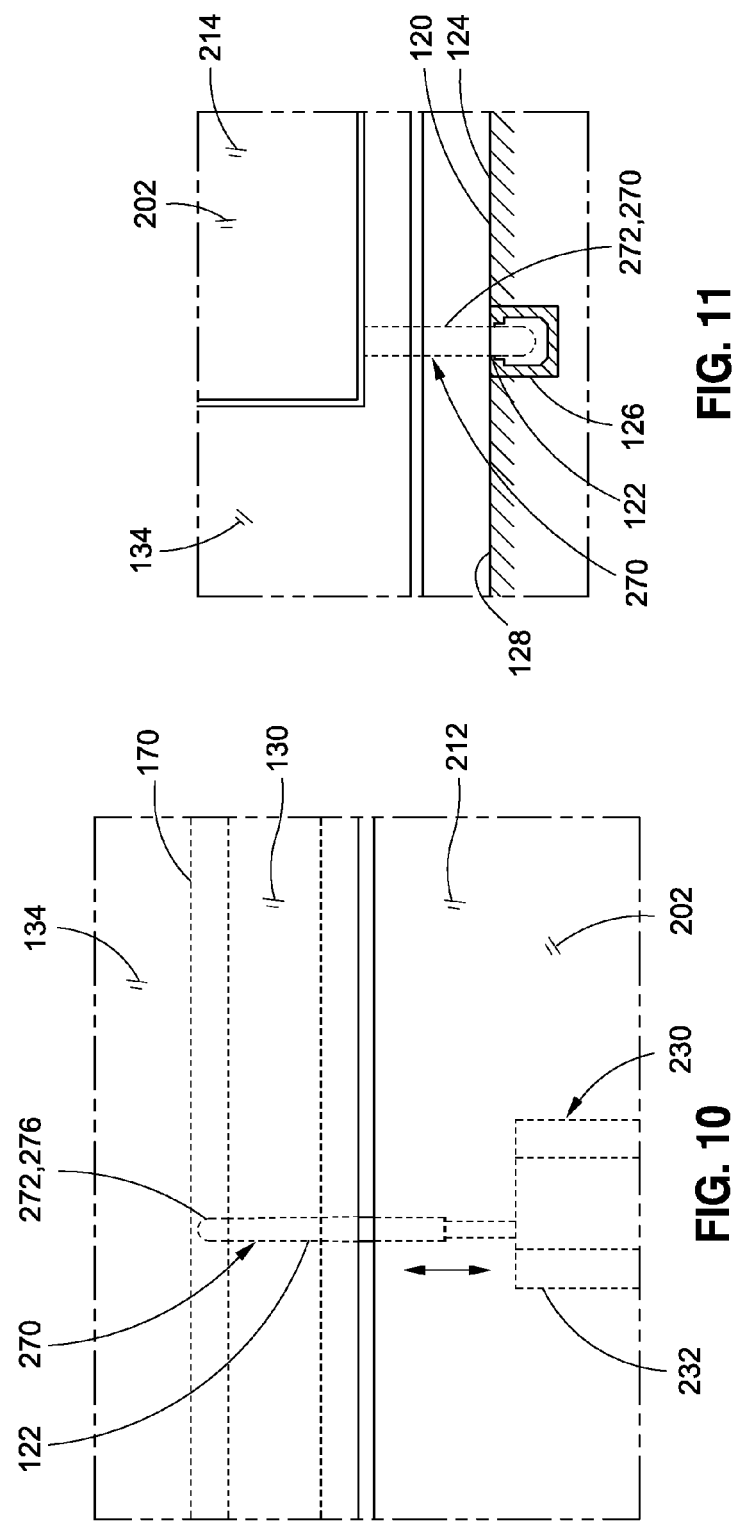

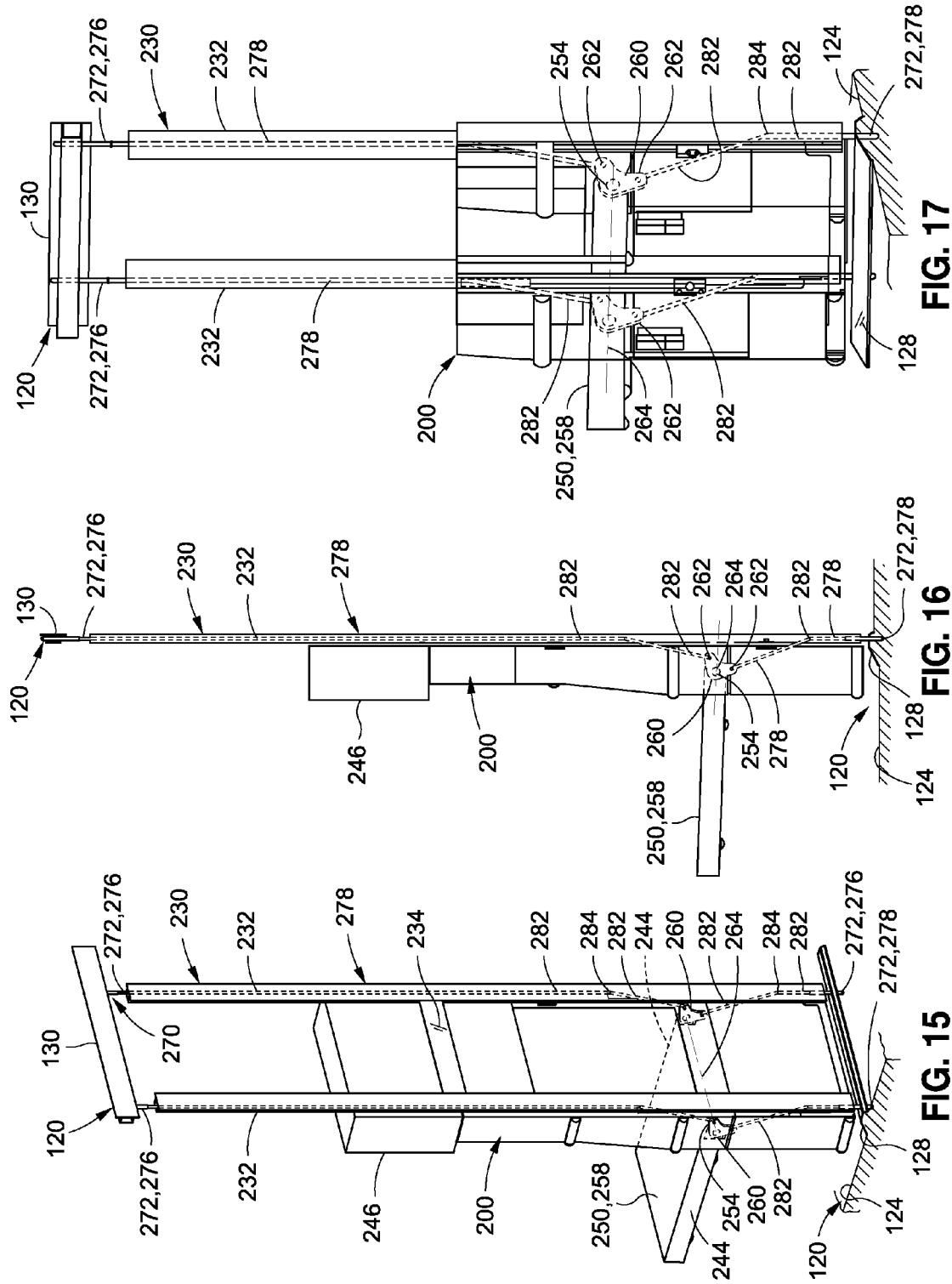

DEPLOYABLE DOOR-MOUNTED SEAT

FIELD

The present disclosure relates generally to vehicle interiors and, more particularly, to a deployable seat mounted to a door.

BACKGROUND

Aircraft regulations for commercial transport aircraft require that each flight attendant is seated with safety belts fastened during takeoff and landing. The seat must be capable of restraining the flight attendant against left-right or side-to-side movement, forward-aft movement, and vertical movement as may occur during a rapid acceleration or deceleration event such as when the aircraft is flying through turbulence or during a hard landing. In addition, aircraft regulations require that when seated, the flight attendant must have a direct view of a main aisle in the area of the cabin for which the flight attendant is responsible. Flight attendant seats are conventionally mounted on a partition or on the walls of a monument. Unfortunately, such conventional mounting of flight attendant seats reduces the total amount of floor space available for revenue-generating passenger seats.

As can be seen, there exists a need in the art for a seat for a flight attendant that occupies a minimum amount of floor space, is capable of supporting lateral loads and vertical loads, and provides the seated flight attendant with the ability to maintain visual observation of a main aisle of the cabin.

SUMMARY

The above-noted needs associated with deployable seats are specifically addressed and alleviated by the present disclosure which provides a seat system incorporated into a door. The door may be movable between an open position and a closed position. The seat system may include a seat mounted to the door and a seat bottom that may be movable between a stowed position and a deployed position. The seat system may further include a locking mechanism incorporated into the door or mounted to the door. The locking mechanism may be operatively coupled to the seat bottom and configured such that movement of the seat bottom from the stowed position to the deployed position when the door is in the closed position causes the locking mechanism to engage a fixed door-frame structure located adjacent to the door immobilize the door against movement from the closed position. Movement of the seat bottom from the deployed position to the stowed position may cause the locking mechanism to disengage from the fixed door-frame structure and allow the door to be moved from the closed position to an open position.

In a further embodiment, the seat system may be implemented in an aircraft having a cabin including a lavatory. The lavatory may include a lavatory door that may be movable between an open position and a closed position. The seat system may include a seat mounted to the lavatory door. The seat may include a seat bottom having a folding mechanism allowing movement of the seat bottom between a stowed position and a deployed position. The seat system may include a locking mechanism which may be incorporated into the door or mounted to the door. The locking mechanism may be operatively coupled to the seat bottom and may be configured such that movement of the seat bottom from the stowed position to the deployed position when the lavatory door is in the closed position causes the locking mechanism to engage fixed door-frame structure located adjacent to the lavatory door to immobilize the lavatory door against movement from the closed position. Movement of the seat bottom from the deployed position to the stowed position may cause the locking mechanism to disengage from the fixed door-frame structure and allow the lavatory door to be moved from the closed position to an open position.

Also disclosed is a method of supporting a seat mounted to a door. The method may include moving a seat bottom of a door-mounted seat to a deployed position when the door is in a closed position. The method may additionally include engaging a locking mechanism of the door to a fixed door-frame structure located adjacent to the door. The locking mechanism may engage with the fixed door-frame structure in response to the seat bottom being moved to the deployed position. The method may include immobilizing the door against movement in response to engagement of the locking mechanism to the fixed door-frame structure.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a front view of a lavatory taken along line 3 of FIG. 2 and illustrating a door-mounted seat system including a deployable seat bottom and a locking mechanism engageable to a fixed door-frame structure when the seat bottom is moved from a stowed position to a deployed position;

FIG. 4 is a side view of the lavatory illustrating the seat bottom in the deployed position causing engagement of translatable pins with at least one of a door threshold and a floor of the fixed door-frame structure;

FIG. 5 is a perspective view of the seat system with the seat bottom in the stowed position;

FIG. 6 is a perspective view of the seat system with the seat bottom in the deployed position and occupied by an occupant;

FIG. 7 is a front view of the seat system with the seat bottom in the deployed position;

FIG. 8 is a back view of the door illustrating a structural frame incorporated into the door and configured to support structural loads imposed on the door by the combined mass of the seat and occupant;

FIG. 9 is a sectional view of the door taken along line 9 of FIG. 7 and illustrating a pair of vertical beams incorporated into the door interior for supporting the translatable pins of the locking mechanism;

FIG. 10 is a magnified view of a translatable pin protruding from a door upper portion and engaged with a door sill of the fixed door-frame structure located above the door;

FIG. 11 is a magnified view of a translatable pin protruding from a door lower portion and engaged with one of a floor and a door threshold of the fixed door-frame structure located below the door;

FIG. 15 is a rear perspective view of the seat system with the door omitted and illustrating the structural frame supporting the seat bottom with the seat in a deployed position;

FIG. 16 is a side view of the seat system of FIG. 15;

FIG. 17 is a front perspective view of the seat system of FIG. 16;

DETAILED DESCRIPTION

Figure 1:
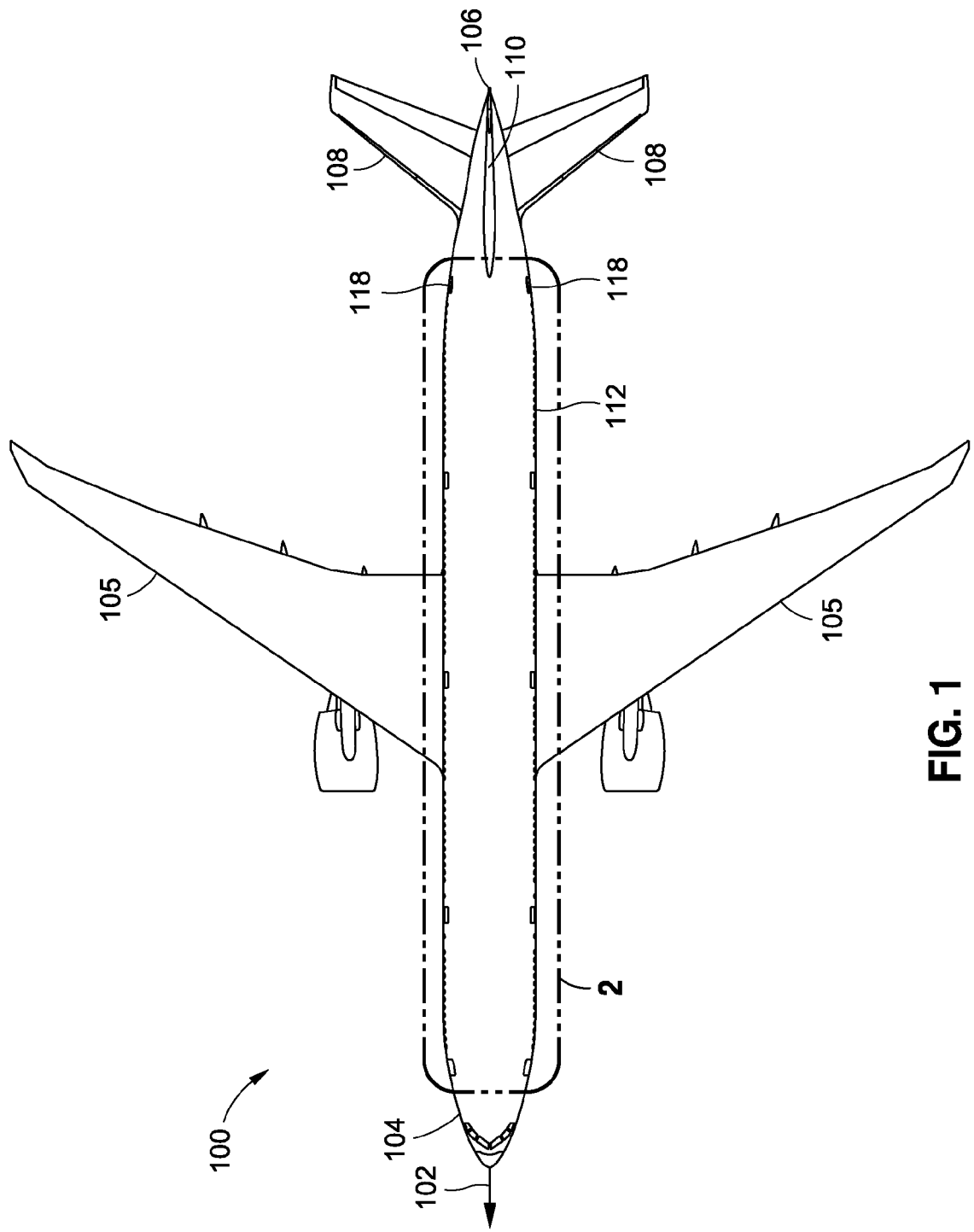
FIG. 1 is a plan view of an aircraft.

Referring now to the drawings wherein the showings are for purposes of illustrating various embodiments of the present disclosure, shown in FIG. 1 is a plan view of an aircraft 100 incorporating a seat system 200 (FIG. 3) as disclosed herein. The aircraft 100 includes a fuselage 104 having an empennage 106. The empennage 106 may include a vertical tail 110 and one or more horizontal tails 108. The aircraft 100 may include a pair of wings 105 extending outwardly from the fuselage 104 and one or more propulsion units which may be supported on the wings 105. The fuselage 104 may include an aircraft cabin 112.

Figure 2:
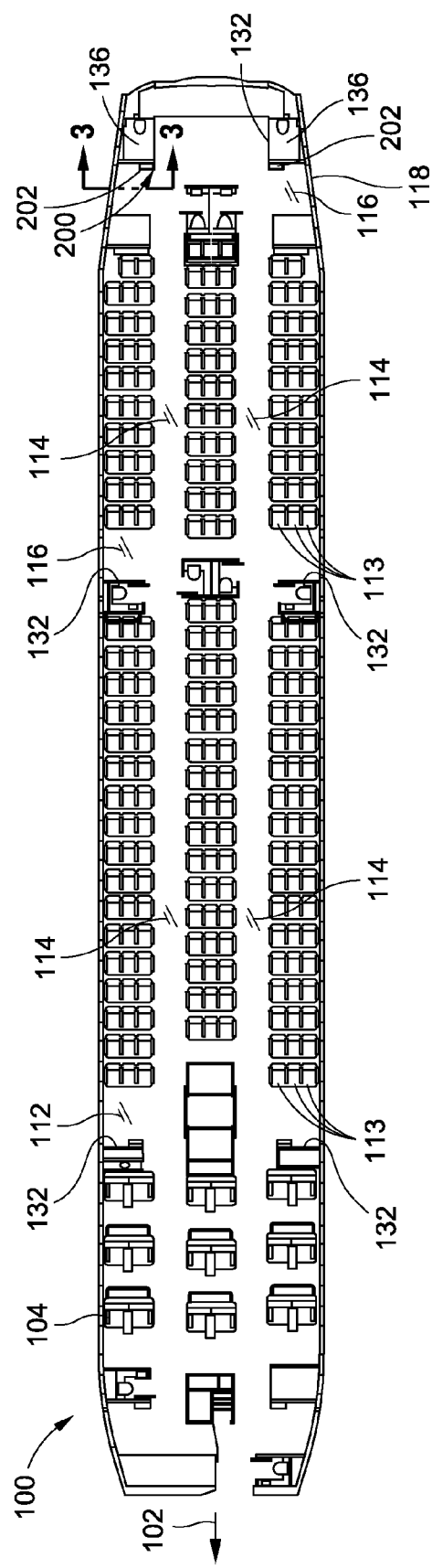
FIG. 2 is an illustration of a seating arrangement of an aircraft cabin.

FIG. 2 shows an example of a seating arrangement of an aircraft cabin 112 including a plurality of passenger seats 113. In the example shown, the passenger seats 113 are separated by two main aisles 114 and a plurality of cross aisles 116. The aircraft cabin 112 may include various monuments 132 such as galleys, closets, and lavatories 136. In the example shown, the presently-disclosed seat system 200 (FIG. 3) may be incorporated into a door 202 (FIG. 3) of one or more of the lavatories 136 at an aft end of the aircraft cabin 112.

In FIG. 2, the seat system 200 is shown mounted to the door 202 in a manner such that a flight attendant (FIG. 6) or other occupant 238 (FIG. 6) sitting in the seat 236 (FIG. 4) has a direct view of a main aisle 114 of the cabin 112. In some examples, the seat 236 may be generally aligned with the main aisle 114. For example, with the door 202 in the closed position 216 (FIG. 3), the seat 236 including the seat back 248 (FIG. 4) and seat bottom 250 (FIG. 3) may be oriented in a forward direction 102 (FIG. 1) of the aircraft 100 relative to a direction of forward motion of the aircraft 100. Alternatively, an aft-facing seat system (not shown) may be mounted on a door 202 of a monument 132 (e.g., a lavatory 136, a closet, etc.) at a forward end (not shown) of the cabin 112 or at a mid-location (not shown) of the cabin 112. Regardless of whether the seat 236 is forward-facing or aft-facing or facing in other directions, the seat 236 may be positioned such that when the door 202 is closed, a flight attendant sitting in the seat 236 may have a direct or unobstructed line-of-sight view of the main aisle 114 of the area of the cabin 112 for which the flight attendant is responsible.

Although the presently-disclosed seat system 200 (FIG. 3) is shown and described mounted to a door 202 (FIG. 2) of a lavatory 136, the seat system 200 may be incorporated into any type door including, but not limited to, a closet door, a cockpit door, an exit door 118 (FIG. 2), or any other type of interior door or exterior door. Furthermore, although the seat system 200 is shown and described as being mounted in a passenger cabin 112 (FIG. 2) of a commercial transport aircraft 100 (FIG. 2), the seat system 200 may be installed in any one of a variety of different types of aircraft, without limitation, including any type of commercial, civilian, and military aircraft and any type of fixed-wing aircraft and rotary-wing aircraft. Even further, the seat system 200 may be implemented in any type of vehicle including any type of air vehicle, space vehicle, land vehicle, and/or marine vessel. In addition, the seat system 200 may be implemented in any type of non-vehicular application including in a building or other stationary structure.

FIG. 3 is a front view of a lavatory 136 illustrating the presently-disclosed seat system 200 mounted to a lavatory door 202. The seat system 200 may include a deployable seat 236 mounted to the door 202. The door 202 may be hingedly movable between an open position 218 (FIG. 18) and a closed position 216. For example, the door 202 may include one or more door hinges 208 located on one door side 206, and a door latch 210 may be located on an opposite door side of the door 202 to latch the door 202 in the closed position 216.

As described in greater detail below, the seat bottom 250 (FIG. 3) which may be movable between a stowed position 256 (FIG. 5) and a deployed position 258 (FIG. 6). In the deployed position 258, the seat bottom 250 may be configured to support an occupant 238 (FIG. 6) such as a flight attendant. In some examples, the seat bottom 250 may be biased toward the stowed position 256 via one or more springs (not shown) such that when the weight of an occupant 238 is removed from the seat bottom 250, the seat bottom 250 automatically retracts into the stowed position 256. Biasing of the seat bottom 250 into the stowed position may prevent the seat bottom 250 from interfering with the movement of flight attendants (FIG. 6) or passengers along the main aisle 114 (FIG. 1) and cross aisles 116 (FIG. 1), or during an emergency exit from a cabin exit door 118 (FIG. 2) which may be located adjacent to the location where the seat system 200 (FIG. 3) is mounted.

In FIG. 3, the seat system 200 may include a locking mechanism 270 which may be incorporated into the door 202 or mounted to the door 202. The locking mechanism 270 may be operatively coupled to the seat bottom 250. The locking mechanism 270 may be configured such that movement of the seat bottom 250 from the stowed position 256 to the deployed position 258 when the door 202 is in the closed position 216 causes the locking mechanism 270 to engage the fixed door-frame structure 120 (e.g., fixed load-carrying structure) located adjacent to and/or surrounding the door 202 in the closed position 216. In one example, the locking mechanism 270 may include translatable pins 272 (FIG. 10) configured to engage a door sill 130 (FIG. 6) located above a door upper portion 212. Alternatively or additionally, the locking mechanism 270 may include translatable pins 272 (FIG. 11) configured to engage a door threshold 128, a seat track 126 (FIG. 11), and/or a floor 124 located below a door lower portion 214. In any of the embodiments disclosed herein, the fixed door-frame structure 120 may be coupled to the primary structure (not shown) of the aircraft 100 such that loads from the seat 236 (FIG. 4) may be transferred into the primary structure. For example, in the case of an aircraft 100, loads from the seat 236 and occupant 238 (FIG. 6) may be transferred into the fixed door-frame structure 120 which may at least partially encompass a lavatory 136 framework (not shown). The lavatory 136 framework may be coupled to the primary structure of the aircraft 100 which may comprise a fuselage 104 (FIG. 1) formed of circumferential frames (not shown) and longitudinal stringers (not shown) supporting a fuselage skin (not shown).

FIG. 4 is a side view of the lavatory 136 of FIG. 3 illustrating the deployable seat 236 mounted to the door 202 with the seat bottom 250 in the deployed position 258. The engagement of the locking mechanism 270 to the fixed door-frame structure 120 may immobilize the door 202 against movement from the closed position 216 (FIG. 3), and may allow the door 202 to support structural loads 138 (FIG. 4) acting on a center of mass 239 of the combined mass of the occupant 238 (FIG. 6) and seat. In the present disclosure, a structural load 138 may be described as a load beyond the static 1-g gravitational load due to the mass of the seat system 200 (FIG. 3). Structural load 138 may include loads generated during an acceleration event. An acceleration event may include rapid or sudden lateral acceleration and/or vertical acceleration due to a hard landing of the aircraft 100 (FIG. 1), hard braking to slow the aircraft 100 after touchdown on the runway, or other acceleration-causing events including abrupt accelerations during flight maneuvering and/or due to turbulence encountered by the aircraft 100 during flight. Movement of the seat bottom 250 from the deployed position 258 to the stowed position 256 (FIG. 3) may cause the locking mechanism 270 to disengage from the fixed door-frame structure 120 and thereby allow the door 202 to be moved from the closed position 216 to an open position 218 (FIG. 18) after unlatching of the door latch 210.

In FIG. 4, seat 236 may include a seat back 248 which may be non-movable or fixedly attached to the door 202 or to a seat frame 242 which may be coupled to the door 202. The seat 236 may also include a head rest 246 which may be fixedly coupled to the door 202 or to the seat frame 242. The seat bottom 250, the seat back 248, the head rest 246, and/or other seat surfaces that may come in contact with an occupant 238 may have a cushioned surface for comfort and safety. The seat bottom 250 may be configured to support an occupant 238 (FIG. 6) in a normal, upright sitting position and may include safety belts 240 (FIG. 6) such as a lap belt and/or a shoulder harness (not shown) to restrain the occupant during an acceleration event or a deceleration event.

As described in greater detail below, the seat system 200 (FIG. 3) may include a folding mechanism 254 (FIGS. 12-17) configured to allow the seat bottom 250 to pivot between the stowed position 256 (FIG. 5) and the deployed position 258. In the deployed position 258 (FIG. 4), the seat bottom 250 (FIG. 4) may extend outwardly from the door 202 (FIG. 3) and may be oriented in a generally horizontal or slightly upwardly-tilted orientation such that a forward edge (not shown) of the seat bottom 250 is position slightly above an aft edge (not shown) of the seat bottom 250. The folding mechanism 254 (FIGS. 12-17) may include one or more seat hinges 252 (FIGS. 12-17) on opposing seat sides 244 (FIGS. 12-17). In some examples, the folding mechanism 254 may have a single pivot axis 264 (FIGS. 12-17) about which the seat bottom 250 may pivot. Alternatively, the folding mechanism 254 may be configured as an articulated hinge (not shown) capable of a combination of rotation and translation of the seat bottom 250 during movement of the seat bottom 250 between the stowed position 256 and the deployed position 258. In the stowed position 256 (FIG. 5), a forward edge of the seat bottom 250 may be pointed upwardly and/or the seat bottom 250 may be oriented substantially parallel to or folded against the seat back 248 or against the door 202 or door-frame.

FIG. 5 is a perspective view of the seat system 200 with the door 202 (FIG. 3) in the closed position 216 and the seat bottom 250 in the stowed position 256. As described in greater detail below, the seat system 200 may include a structural frame 230 coupled to the door 202 and configured to reinforce the door 202 against the structural loads 138 (FIG. 4) imposed by the seat 236 and occupant 238 (FIG. 6) on the door 202. For example, the structural frame 230 may increase the bending stiffness of the door 202 which, in the example of a conventional aircraft lavatory door 202, may be a relatively lightweight, hollow, slab door. The structural frame 230 may transfer structural loads 138 from the seat 236 to the fixed door-frame structure 120 surrounding the door 202.

FIG. 6 is a perspective view of the seat system 200 (FIG. 3) with the seat bottom 250 in the deployed position 258 and occupied by an occupant 238. When the seat bottom 250 is moved to the deployed position 258, the locking mechanism 270 may engage the fixed door-frame structure 120. For example, in FIG. 6, the locking mechanism 270 may include translatable pins 272 that may protrude upwardly from the door upper portion 212 into a door sill 130, and translatable pins 272 that may protrude downwardly from the door lower portion 214 into a door threshold 128 or a floor 124 (FIG. 4).

FIG. 7 is a front view of the seat system 200 with the seat bottom 250 in the deployed position 258. In the example shown, the translatable pins 272 may be housed within a pair of vertical beams 232 that may be integrated into the door interior 222 (FIG. 9). The seat frame 242 may be directly coupled to the structural frame 230 to transfer loads from the seat 236 to the structural frame 230. In the example shown, the position of the seat 236 on the door 202 (FIG. 3) may be biased toward the side of the door 202 containing the door hinges 208 as a means to facilitate the transfer of at least a portion of the structural load 138 (FIG. 4) into the door hinges 208, and from the door hinges 208 into the fixed door-frame structure 120. As indicated above, the fixed door-frame structure 120 may include a door sill 130 located above the door upper portion 212. The door sill 130 may be integrated into the monument wall 134 above the door upper portion 212, or the door sill 130 may be mounted on a surface of the monument wall 134.

FIG. 8 is a back view of the door 202 illustrating an example of the structural frame 230 incorporated into the door 202. The structural frame 230 may be configured to support structural loads 138 (FIG. 4) on the door 202 imposed by the combined mass of the seat 236 (FIG. 4) and occupant 238 (FIG. 4). The structural frame 230 may include the pair of vertical beams 232 and may further include one or more cross beams 234 interconnecting the vertical beams 232. The seat frame 242 may be coupled to the vertical beams 232 and the cross beam 234. In the example shown, the vertical beams 232 may extend along an entire height of the door 202. However in other examples, the vertical beams 232 may extend along any portion of the door 202. Although the structural frame 230 is illustrated as including two vertical beams 232 and a single cross beam 234, the structural frame 230 may be provided in any one of a variety of different configurations. For example, the structural frame 230 may include a single vertical beam 232, or the structural frame 230 may include more than two vertical beams 232. In addition, the structural frame 230 may include non-vertically-oriented beams and non-horizontally-oriented beams.

FIG. 9 is a sectional view of the door 202 of FIG. 7 showing the pair of vertical beams 232 of the structural frame 230 incorporated into the door interior 222. Although not shown, the structural frame 230 may be mounted to a door exterior 220. As indicated above, the structural frame 230 may be configured to house the connecting rods 278 (FIGS. 12-17) and/or the translatable pins 272 of the locking mechanism 270. In the example shown, each one of the vertical beams 232 may have a hollow interior within which the connecting rods 278 and/or translatable pins 272 may be slidably supported. The translatable pins 272 may be linearly movable between a retracted position 274 (FIGS. 12-14) when the seat bottom 250 is in the stowed position 256, and an engaged position 276 (FIGS. 15-17) when the seat bottom 250 (FIG. 6) is in the deployed position 258 (FIG. 6). In the retracted position 274, the translatable pins 272 may be partially protruding or non-protruding and recessed in the door upper portion 212 (FIG. 8) and/or in the door lower portion 214 (FIG. 8). In the engaged position 276, the translatable pins 272 may protrude beyond the edges of the door upper portion and the door lower portion 214 such that the translatable pins 272 may be engaged to the fixed door-frame structure 120 (FIG. 8).

FIG. 10 shows a magnified view of a translatable pin 272 protruding out of one of the vertical beams 232 at the door upper portion 212. The translatable pin 272 is shown in an engaged position 276 wherein the translatable pin 272 is engaged with a door sill 130 located above the door upper portion 212. The door sill 130 may be part of the fixed door-frame structure 120. FIG. 11 shows a translatable pin 272 protruding from a door lower portion 214 in an engaged position 276 wherein the translatable pin 272 is engaged with the floor 124 and/or the door threshold 128 located below the door lower portion 214. Although not shown, the locking mechanism 270 may include a pin mounting fixture (not shown) for slidably supporting (e.g., via a pin bushing) a translatable pin 272 and allowing translation of the translatable pin 272 along an axial direction between the retracted position 274 and the engaged position 276 within the pin mounting fixture.

In an embodiment, the seat system 200 may include a pair of translatable pins 272 (FIG. 9) which may linearly translate out of the door upper portion 212 (FIG. 8) to engage the fixed door-frame structure 120 (FIG. 8). Additionally or alternatively, the seat system 200 may include a pair of translatable pins 272 which may linearly translate out of the door lower portion 214 (FIG. 8) to engage the fixed door-frame structure 120. The translatable pins 272 may be housed within the door interior 222 (FIG. 9) in the retracted position. For example, the translatable pins 272 may be axially slidably within the vertical beams 232 (FIG. 9). Alternatively, the translatable pins 272 may be slidably mounted to the door exterior 220 (not shown).

In FIGS. 10-11, when the translatable pins 272 are in the engaged position 276, the translatable pins 272 may be received within corresponding sockets 122 that may be included with the fixed door-frame structure 120. Such sockets 122 may be sized to provide a non-interference fit or a clearance fit with the translatable pins 272 to facilitate the transfer of structural loads 138 from the translatable pins 272 to the fixed door-frame structure 120. In one example, the sockets 122 and translatable pins 272 may be sized to provide a clearance of no greater than 0.003 inch. For a pin diameter of 0.32 inch, a socket 122 may have a diameter of between 0.32-0.35 inch. The open end of the socket 122 may be beveled (not shown) or the terminal end of the translatable pin 272 may be tapered (not shown) to guide the translatable pin 272 into the socket 122 as the translatable pin 272 is moved from a retracted position 274 (FIGS. 12-14) to an engaged position 276 (FIGS. 12-14) into the socket 122.

Although the present disclosure describes the locking mechanism 270 (FIG. 10) in the context of translatable pins 272 (FIG. 10) that are alternately moved between a retracted position 274 (FIGS. 12-14) and an engaged position 276 (FIGS. 15-17) in response to movement of the seat bottom 250 (FIG. 5) between a stowed position 256 (FIGS. 12-14) and a deployed position 258 (FIGS. 15-17), the locking mechanism 270 may include any type of locking member capable of coupling the door upper portion 212 (FIG. 8) and/or the door lower portion 214 (FIG. 8) to fixed door-frame structure 120 (FIG. 8) when the seat bottom 250 is moved from a stowed position 256 to a deployed position 258. For example, the locking mechanism 270 may include threaded bolts (not shown) that may be rotated by a stepper motor (not shown) causing the threaded bolts to axially translate outwardly from a door upper portion 212 or door lower portion 214, and threadably engage with threaded holes (not shown) that may be formed in the fixed door-frame structure 120. Such threaded bolts may be threadably disengaged (e.g., via the stepper motor) from the threaded holes upon movement of the seat bottom 250 from the deployed position 258 to the stowed position 256.

Even further, the locking mechanism 270 (FIG. 11) may comprise a plurality of latches (not shown) or clamps (not shown) that may be actuated in response to movement of the seat bottom 250 (FIG. 5) from the stowed position 256 (FIGS. 12-14) to the deployed position 258 (FIGS. 15-17), and causing such latches or clamps to mechanically couple to complementarily features (not shown) of the fixed door-frame structure 120 (FIG. 11) when the seat bottom 250 is moved from the stowed position 256 to the deployed position 258. Such latches or clamps may be configured to mechanically decouple from the complementarily features when the seat bottom 250 is moved from the deployed position 258 to the stowed position 256. In a still further embodiment, the locking mechanism 270 may incorporate magnetic coupling (not shown) as a means to selectively couple the door 202 (FIG. 10) and/or structural frame 230 (FIG. 10) to fixed door-frame structure 120 when the seat bottom 250 is moved to the deployed position 258 and the door 202 is in the closed position 216. As may be appreciated, the locking mechanism 270 may be provided in any one of a variety of different configurations, and is not limited to translatable pins 272 (FIG. 10) that are translatable between a retracted position 274 (FIGS. 12-14) and engaged position 276 (FIGS. 15-17).

The seat system 200 (FIG. 5) may be configured to support structural loads 138 (FIG. 4) imposed by the combined mass of the seat 236 (FIG. 4) and occupant 238 (FIG. 4) during an acceleration event. In this regard, the seat system 200 including the seat 236 in combination with the locking mechanism 270 (FIG. 10) and the structural-frame-reinforced door 202 (FIG. 10) may be configured to transfer structural loads 138 from the seat 236 to the fixed door-frame structure 120 and thereby prevent vertical movement and/or lateral movement of the occupied seat 236 in response to lateral loads 140 (FIG. 4) and/or vertical loads 142 (FIG. 4) imposed by the combined mass of the seat 236 and occupant 238 during an acceleration event as described above. The seat 236 may be configured to support lateral loads 140 and/or vertical loads 142 including uploads and downloads imposed on the seat 236 by the mass of the occupant 238 via a safety belt 240 system (e.g., a lap belt and shoulder harness) restraining the occupant 238 from vertical movement and lateral movement such as due to acceleration or deceleration of the aircraft 100 (FIG. 1) in a forward direction 102 (FIG. 1) or aft direction. The forward direction 102 may be equivalent to the direction of forward motion of a vehicle such as of an aircraft. In the present disclosure, a structural load 138 may be described as the mass (e.g., weight) of the seat 236 and occupant 238 under acceleration (e.g., vertical acceleration or lateral acceleration).

In one example, the seat system 200 may be configured to support lateral loads 140 (FIG. 4) due to a 16-g forward acceleration per Federal Aviation Regulation (FAR) 25.562 which requires that the seat 236 (FIG. 4) and occupant 238 (FIG. 4) remain attached to the structure (e.g., remain attached to the door 202 and the fixed door-frame structure 120) irrespective of any yielding in the structure. Additionally or alternatively, the seat system 200 may be configured to support a vertical load 142 (FIG. 4) such as a downward load ranging from a 1-g gravitational load of the combined mass of the seat 236 and occupant 238 up to a 3-g or more downward acceleration of the seat 236 and occupant 238 as may occur in the event of a hard landing. As indicated above, the door 202 (FIG. 11) may include one or more door hinges 208 and/or at least one door latch 210. The door hinges 208 (FIG. 7) and door latch 210 (FIG. 7) may be sized and configured to support at least a portion of the lateral loads 140 and vertical loads 142 imposed by the combined mass of the occupant 238 and seat system 200 (FIG. 5).

Figure 14:
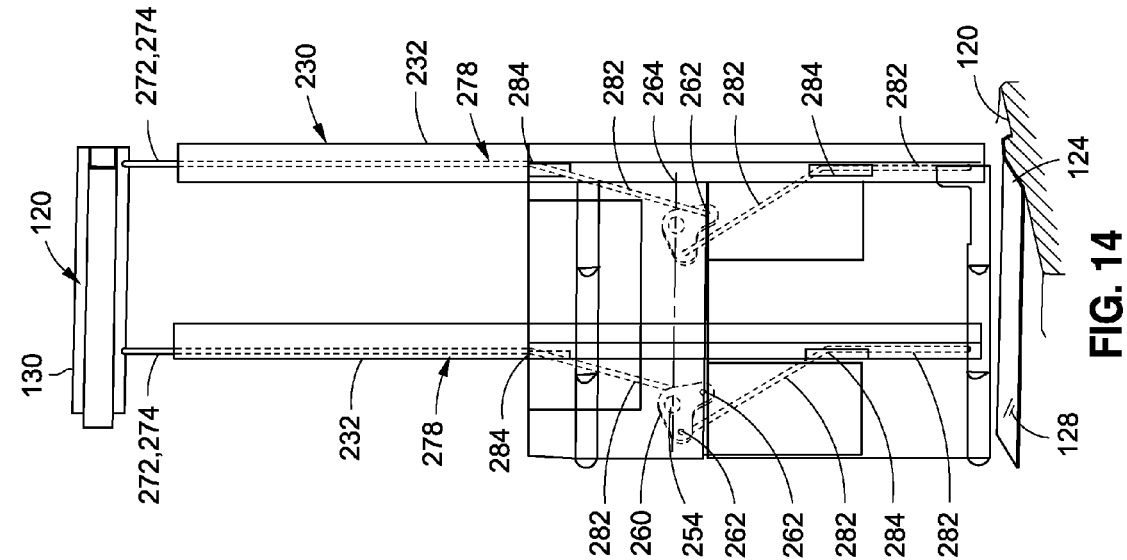
FIG. 14 is front perspective view of the seat system of FIG. 13.
Figure 13:
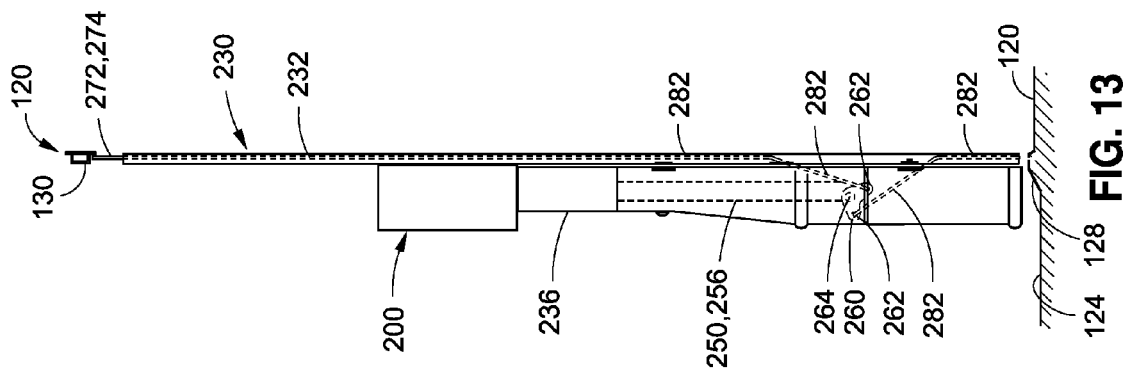
FIG. 13 is a side view of the seat system of FIG. 12.
Figure 12:
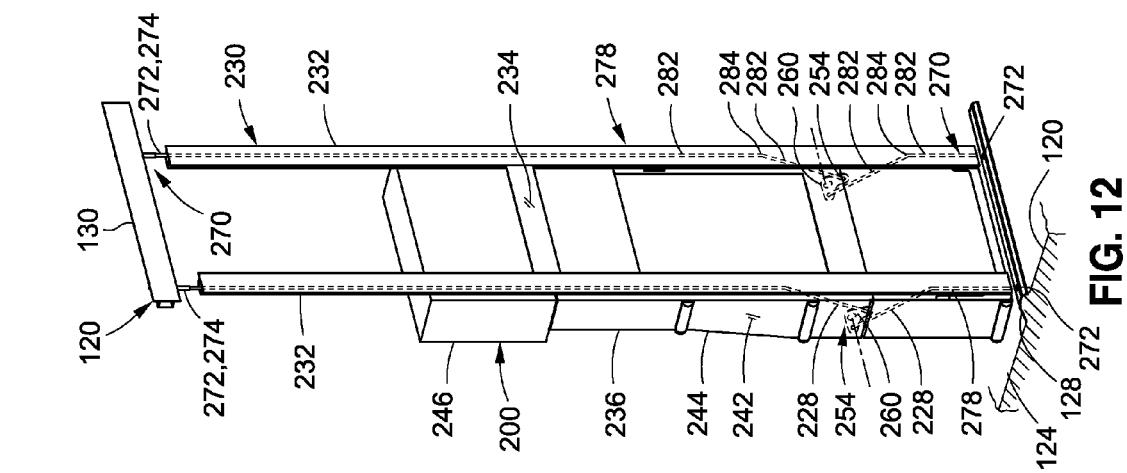
FIG. 12 is a rear perspective view of the seat system with the door omitted and illustrating the structural frame supporting the seat with the seat bottom in a stowed position.

FIG. 12 is a rear perspective view of the seat system 200 with the door 202 (FIG. 5) omitted for clarity, and illustrating the seat bottom 250 (FIG. 13) in the stowed position 256 (FIG. 13). FIG. 13 is a side view of the seat system 200 of FIG. 12, and FIG. 14 is a front perspective view of the seat system 200. As indicated above, the locking mechanism 270 (e.g., the translatable pins 272) may be mechanically actuated in response to deployment of the seat bottom 250 from the stowed position 256 (FIGS. 12-14) to the deployed position 258 (FIGS. 15-17) when the door 202 is in the closed position 216. FIGS. 12-17 illustrate an example of the seat system 200 wherein the translatable pins 272 are mechanically actuated. In the example shown, the seat bottom 250 may include a pair of cams 260 fixedly mounted to respective opposing seat sides 244 of the seat bottom 250. The cams 260 may move with the seat bottom 250 as the seat bottom 250 is moved (e.g., pivoted) about a pivot axis 264 between the stowed position 256 and the deployed position 258 (FIGS. 15-17). The movement of the cams 260 causes the locking mechanism 270 to engage with or disengage from the fixed door-frame structure 120.

In the example of the seat system 200 of FIG. 14, each cam 260 may have a pair of cam lobes 262. Each one of the cam lobes 262 may be coupled to a connecting rod 278. Each connecting rod 278 may be coupled to a translatable pin 272 which may be mounted on an end of the connecting rod 278. In the example shown, each connecting rod 278 may be made up of a pair of rod segments 282 interconnected by a rod hinge 284. One of the rod segments 282 of the pair may be axially movable within one of the vertical beams 232 and may have a translatable pin 272 at one end of the rod segment 282 and a rod hinge 284 at an opposite end. The other rod segment 282 of the pair may extend between the rod hinge 284 and a cam lobe 262 and may be configured to rotate and translate as the cam 260 rotates with the seat bottom 250.

FIG. 15 shows the seat system 200 with the door 202 (FIG. 5) omitted for clarity, and illustrating the seat 236 (FIG. 4) in the deployed position 258. FIG. 16 is a side view of the seat system 200, and FIG. 17 is a front perspective view of the seat system 200. As indicated above, when the seat bottom 250 is moved into the deployed position 258, the connecting rods 278 which are coupled to the cam lobes 262 cause the translatable pin 272 to be extended outwardly from the respective door upper portion 212 (FIG. 8) and/or door lower portion 214 (FIG. 8). In this regard, the translatable pins 272 may be linearly moved from a retracted position 274 into an engaged position 276 wherein the translatable pins 272 engage with the fixed door-frame structure 120 such as the above-mentioned door sill 130 located above the door upper portion 212, and the above-mentioned floor 124, door threshold 128, or seat track 126 (FIG. 11) located below the door lower portion 214. However, the fixed door-frame structure 120 may comprise any non-movable or fixed structure surrounding the door 202 and capable of transmitting loads into the primary structure (not shown) of the aircraft 100, and is not limited to a door sill 130, a door threshold 128, a seat track 126, or a floor 124.

Figure 18:
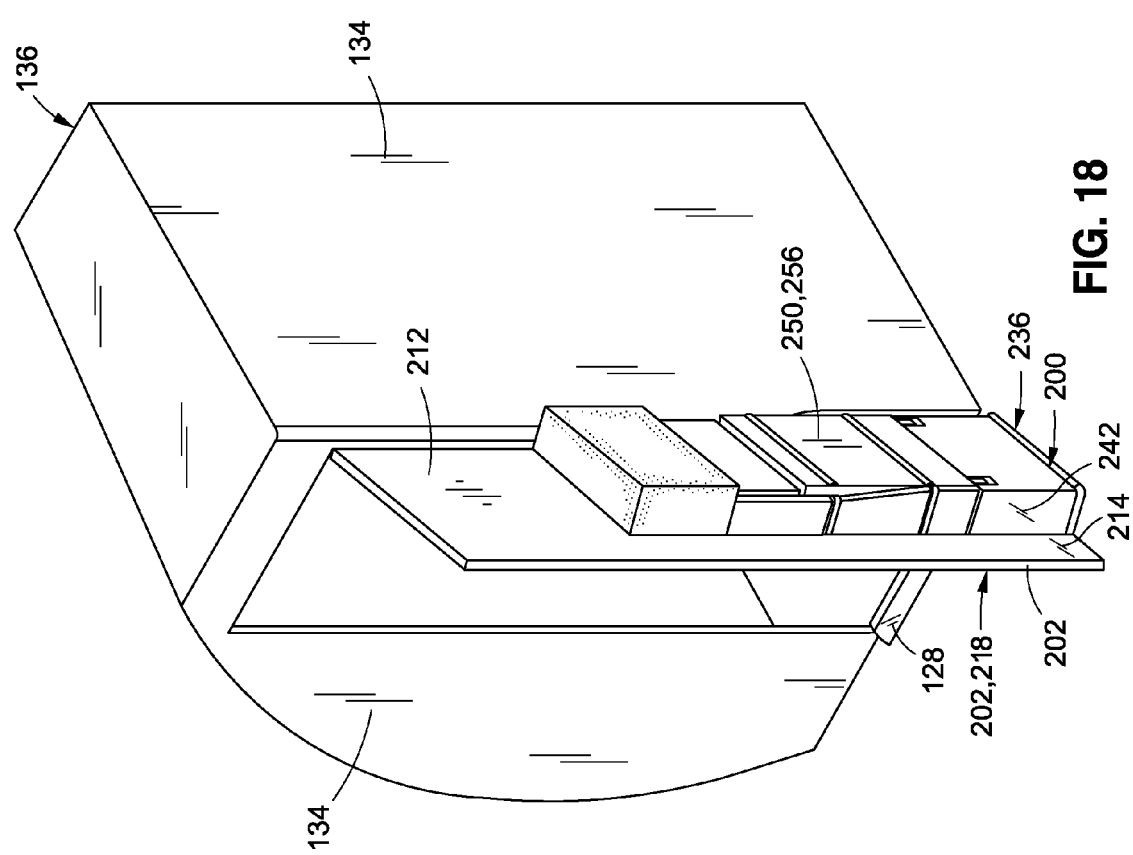
FIG. 18 is a perspective view of the seat system mounted to a lavatory door in an open position.

FIG. 18 shows the seat system 200 mounted to a lavatory door 202 in the open position 218. The seat bottom 250 is shown in the stowed position 256 which corresponds to a retracted position 274 (FIGS. 12-14) of the translatable pins 272 (FIG. 11) at the door upper portion 212 (FIG. 8) and/or door lower portion 214 (FIG. 8), and which allows the lavatory door 202 to be moved from the closed position 216 (FIG. 3) to the open position 218. As indicated above, movement of the seat bottom 250 to the stowed position 256 causes the cams 260 (FIG. 17) to linearly retract the translatable pins 272 from the fixed door-frame structure 120 and allowing the door 202 to be moved from the closed position 216 to the open position 218.

Figure 19:
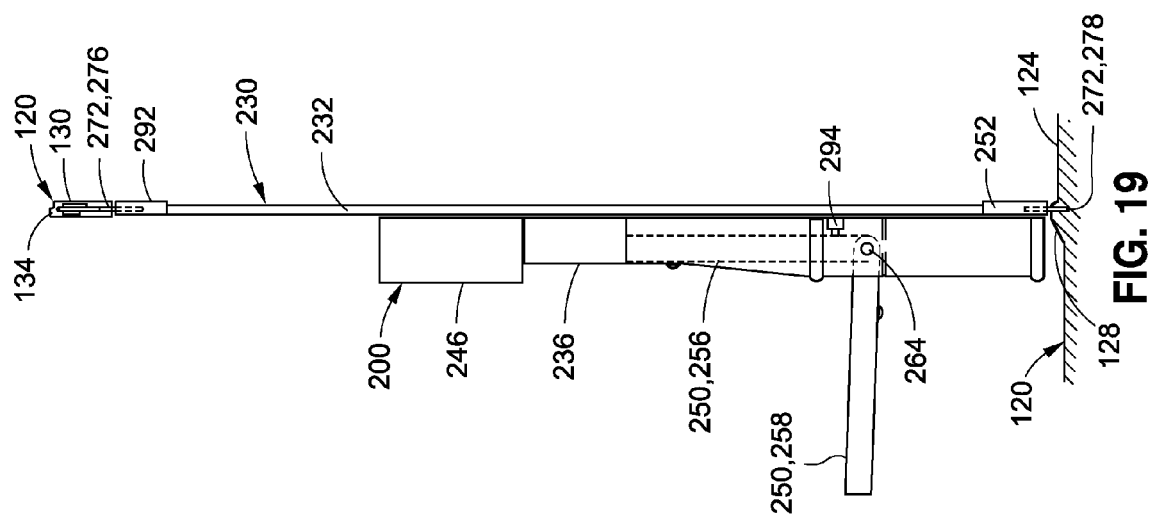
FIG. 19 is a side view of an example of a seat system where the locking mechanism includes electrical actuators configured to move the translatable pins into engagement with the fixed door-frame structure.

FIG. 19 is a side view of an example of a seat system 200 where the locking mechanism 270 is electrically actuated. In the example shown, the locking mechanism 270 (FIG. 10) includes electrical actuators 292 mounted at the door upper portion 212 (FIG. 8) and at the door lower portion 214 (FIG. 8). Each one of the electrical actuators 292 may be configured to linearly move a translatable pin 272 between the retracted position 274 (FIGS. 12-14) and engaged position 276. The locking mechanism 270 may be electrically coupled (e.g., wirelessly or hardwired) to one or more sensors 294 configured for sensing the position of the seat bottom 250. In an embodiment, the one or more sensors 294 may be configured to sense movement or positioning of the seat bottom 250 in the deployed position 258. Upon receiving a signal from the sensors 294 indicating that the seat bottom 250 is in the deployed position 258, each electrical actuator 292 may be configured to linearly translate a translatable pin 272 into engagement with the fixed door-frame structure 120.

Figure 20:
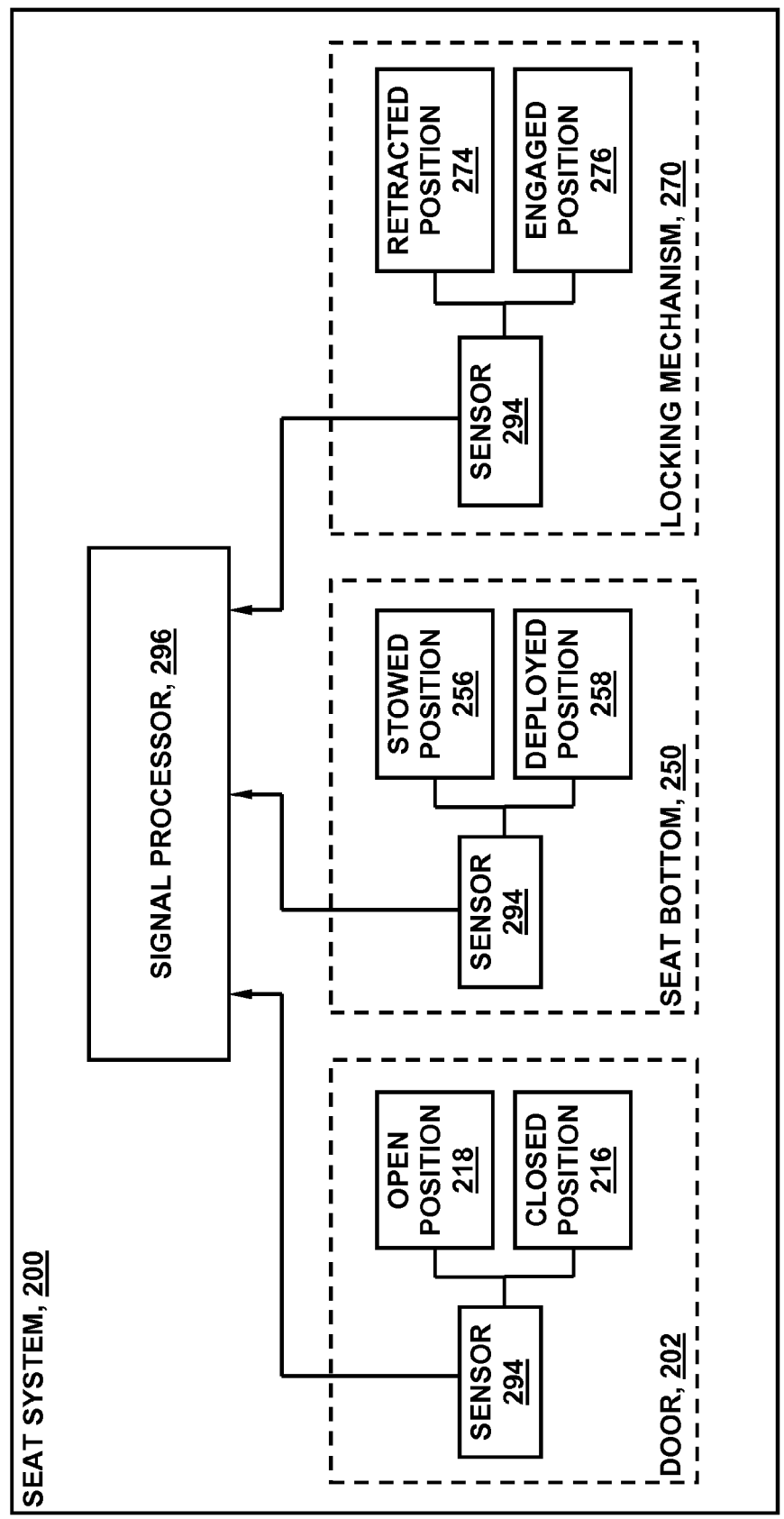
FIG. 20 is a block diagram of a portion of the seat system including a signal processor configured to receive and process signals transmitted by sensors for monitoring the relative position of the door, the seat bottom, and the locking mechanism.

FIG. 20 is a block diagram of a portion of an embodiment of a seat system 200 including a signal processor 296 configured to receive and process signals transmitted by sensors 294 for monitoring the relative position of the door 202, the seat bottom 250, and the locking mechanism 270. In one aspect, the signal processor 296 may enable the collection and analysis of data regarding the use of the deployable seat 236 (FIG. 4). For example, the seat system 200 may include one or more sensors 294 configured to sense movement of the door 202 between the closed and open position 218, movement of the seat bottom 250 between the stowed position 256 and the deployed position 258, and/or movement of the translatable pins 272 (FIG. 10) between the refracted position 274 and engaged position 276. The sensors 294 may be configured to transmit signals to the signal processor 296 which may collect data represented by the signals and/or record a time history of the above-noted seat system operating parameters including, but not limited to, door movement, seat bottom deployment, and translatable pin engagement. The sensors 294 may be provided as mechanical sensors, optical sensors, and/or other types of sensors.

Figure 21:
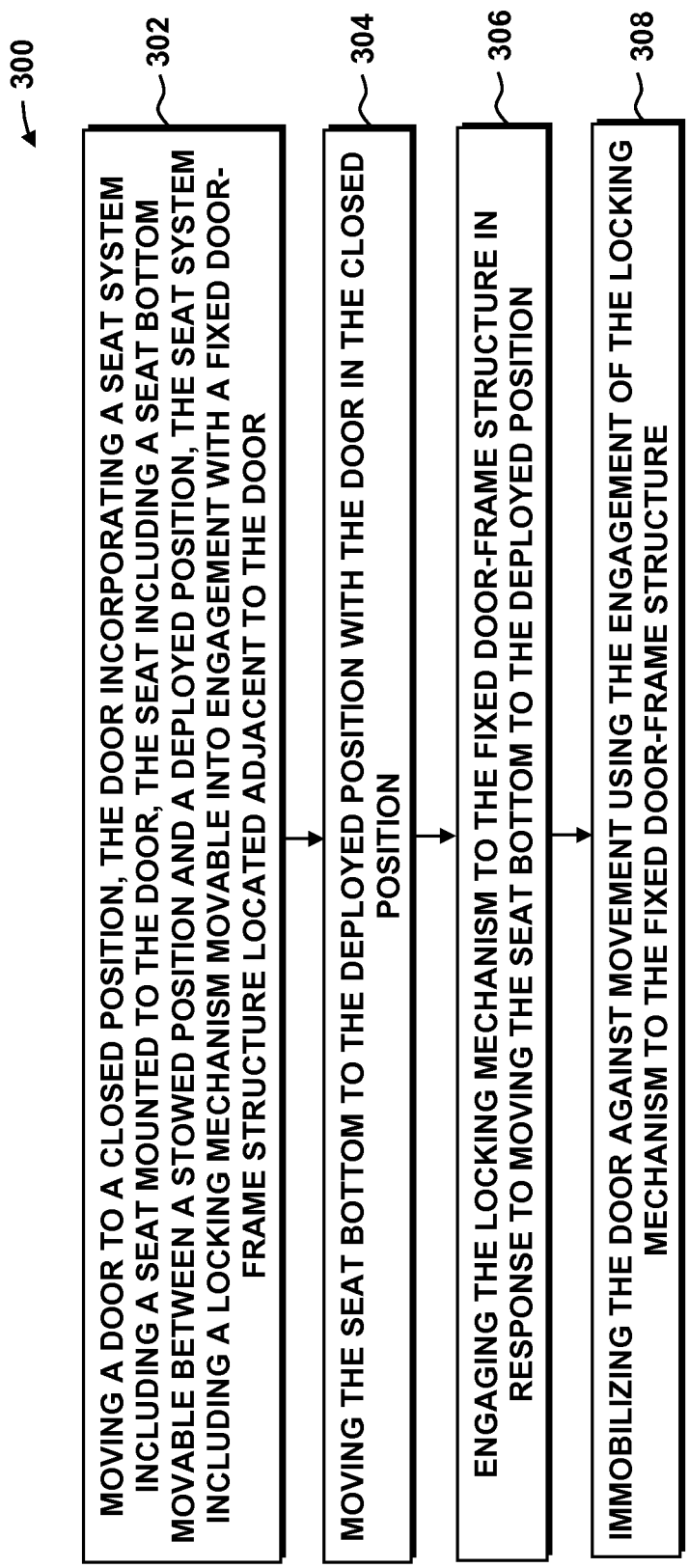
FIG. 21 is a flowchart having one or more operations that may be included in a method of supporting a seat system mounted to a door.

FIG. 21 is a flowchart having one or more operations that may be included in a method 300 of supporting a seat system 200 (FIG. 3) mounted to a door 202 (FIG. 4). As indicated above, the seat 236 (FIG. 4) may include a seat bottom 250 (FIG. 3) that may be movable between a stowed position 256 (FIG. 5) and a deployed position 258 (FIG. 7) when the door 202 is in a closed position 216 (FIG. 7). The seat system 200 may include a locking mechanism 270 (FIG. 11) which may be movable into engagement with a fixed door-frame structure 120 (FIG. 11) as indicated above to transfer structural loads 138 (FIG. 4) from the door-mounted seat 236 into the fixed door-frame structure 120 surrounding the door 202 when the door 202 is in the closed position 216.

Step 302 of the method 300 of FIG. 21 may include moving the door 202 (FIG. 5) to the closed position 216. As indicated above, the door 202 made be hingedly coupled via door hinges 208 (FIG. 3) to a fixed door-frame structure 120 (FIG. 6) such as along a side edge of a cutout in a wall 134 (FIG. 4) of a lavatory 136 (FIG. 4). In the closed position 216 (FIG. 5), the door latch 210 may be latched (e.g., via the door latch 210) to the fixed door-frame structure 120 on a side of the door 202 opposite the door hinges 208.

Step 304 of the method 300 of FIG. 21 may include moving a seat bottom 250 from the stowed position 256 (FIG. 5) to the deployed position 258 (FIG. 6) with the door 202 (FIG. 4) in the closed position 216 (FIG. 5). As indicated above, the seat bottom 250 (FIG. 5) may be biased toward the stowed position 256 via one or more springs (not shown) such that when the weight of an occupant 238 is removed from the seat bottom 250, the seat bottom 250 may automatically retract into the stowed position 256. In one example, the seat bottom 250 may pivot about a pivot axis 264 as shown in FIGS. 12-17. In other examples not shown, the seat bottom 250 may undergo a combination of translation and rotation during movement from the stowed position 256 to the deployed position 258

Step 306 of the method 300 of FIG. 21 may include engaging the locking mechanism 270 (FIG. 11) to a fixed door-frame structure 120 (FIG. 11) located adjacent to the door 202. The seat system 200 (FIG. 12) may be configured such that the locking mechanism 270 engages the fixed door-frame structure 120 when the seat bottom 250 (FIG. 3) is moved to the deployed position 258 (FIG. 6) with the door 202 in the closed position 216 as shown in FIG. 5. The step of engaging the locking mechanism 270 with the fixed door-frame structure 120 may be performed by mechanically actuating (FIGS. 12-17) the locking mechanism 270 into engagement with the fixed door-frame structure 120, or by electrically actuating (FIG. 19) the locking mechanism 270 into engagement with the fixed door-frame structure 120. For example, the step of engaging the locking mechanism 270 with the fixed door-frame structure 120 may be performed by extending one or more translatable pins 272 from a door edge 204 into fixed door-frame structure 120 located adjacent to the door edge 204. As indicated above, the translatable pins 272 (FIG. 10) may be linearly extended from the door upper portion 212 (FIG. 10) into engagement with a door sill 130 or other fixed door-frame structure 120 located above the door upper portion 212. In addition, translatable pins 272 may be linearly extended from a door lower portion 214 (FIG. 11) into engagement with a door threshold 128, a floor 124, a seat track 126 (FIG. 11), and/or other fixed door-frame structure 120 located below the door lower portion 214.

As indicated above, the seat bottom 250 (FIG. 7) may include a pair of cams 260 (FIG. 12) fixedly coupled to prospective opposing sides of the seat bottom 250. Each one of the translatable pins 272 (FIG. 12) may be coupled to a cam 260 by means of a connecting rod 278 (FIGS. 12-17), as described above. The step of engaging the locking mechanism 270 (FIG. 12) to the fixed door-frame structure 120 (FIG. 12) may include rotating the cams 260 with the seat bottom 250 as a seat bottom 250 is moved from the stowed position 256 (FIGS. 12-14) to the deployed position 258 (FIGS. 15-17). In response to rotating the cams 260, the translatable pins 272 may be linearly extended from a retracted position 274 (FIGS. 12-14) to an engaged position 276 (FIGS. 15-17) wherein the translatable pins 272 may be received within corresponding sockets 122 (FIG. 11) formed in the fixed door-frame structure 120.

Referring briefly to FIG. 19, in a further embodiment, the locking mechanism 270 may be electrically actuated (FIG. 19) into engagement with the fixed door-frame structure 120. In this regard, the step of engaging the locking mechanism 270 with the fixed door-frame structure 120 may include sensing, using at least one sensor 294, movement of the seat bottom 250 into the deployed position 258. For example, movement of the seat bottom 250 from the stowed position 256 to the deployed position 258 may cause a sensor 294 to transmit a signal (not shown) to one or more electrical actuators 292 located at the door upper portion 212 and to one or more electrical actuators 292 located at the door lower portion 214. The signal may represent that the seat bottom 250 is in the deployed position 258. As indicated above, each one of the electrical actuators 292 may be configured for linearly translating a translatable pin 272 between a retracted position 274 (FIGS. 12-14) and an engaged position 276 (FIGS. 15-17). Upon receiving the signal, the electrical actuators 292 may linearly translate the translatable pins 272 into engagement with the fixed door-frame structure 120, such as the door sill 130 located above the door upper portion 212 (FIG. 8), and the door threshold 128 or floor 124 located below the door lower portion 214 (FIG. 8).

Step 308 of the method 300 of FIG. 21 may include immobilizing the door 202 against movement using the engagement of the locking mechanism 270 to the fixed door-frame structure 120 (FIG. 11). The immobilization of the door 202 (FIG. 11) by the locking mechanism 270 (FIG. 4) may allow for the transfer of structural loads 138 (FIG. 4) from the seat 236 (FIG. 4) into the fixed door-frame structure 120. In this regard, the step of transferring structural loads 138 imposed on the seat bottom 250 (FIG. 7) into the fixed door-frame structure 120 may include transferring lateral loads 140 (FIG. 4) and/or vertical loads 142 (FIG. 4) imposed on the seat bottom 250 into the fixed door-frame structure 120. As indicated above, lateral loads 140 and/or vertical loads 142 may be caused by accelerations or decelerations of an aircraft 100 (FIG. 1) during flight (e.g., due to turbulence) and/or during takeoff and/or landing (e.g., a hard landing or an emergency landing condition). The step of transferring structural loads 138 from the seat 236 to the fixed door-frame structure 120 may include transferring the structural load 138 from the seat 236 into a structural frame 230 (FIG. 12) which may be included with the seat system 200 and may be integrated into the door interior 222 (FIG. 9) or mounted on the door exterior 220 (FIG. 9), as described above. The method may include transferring the structural load 138 from the structural frame 230 to the locking mechanism 270, and transferring the structural load 138 from the locking mechanism 270 to the fixed door-frame structure 120.

As indicated above, the seat system 200 (FIG. 3) is configured to support structural loads 138 (e.g., lateral loads 140 and/or vertical loads 142) imposed by the inertia of the combined mass of the seat 236 and occupant 238 (FIG. 6). In this regard, when an occupant 238 sitting in the seat 236 (FIG. 4) is restrained against movement relative to the seat bottom 250 (FIG. 4) such as via a seat 236 belt system (e.g., a lap belt and/or a shoulder belt), the immobilization of the door 202 (FIG. 4) relative to the fixed door-frame structure 120 (FIG. 4) may prevent lateral movement (e.g., forward movement and/or aft movement) of the door 202 which an unreinforced door 202 and door latch 210 (FIG. 5) acting alone may be unable to prevent under certain loading conditions such as lateral loads 140 (FIG. 4) due to a 16-g forward acceleration of the occupant 238. In this regard, the combination of the structural frame 230 and the locking mechanism 270 (FIG. 6) in the engaged position 276 (FIGS. 15-17) may allow the seat 236 to be rated (e.g., per FAR 25.562) for a 16-g takeoff and landing load condition which the combination of unreinforced door 202, door hinges 208 (FIG. 8), and door latch 210 may be unable to react without the structural frame 230 and/or the locking mechanism 270. In addition, the immobilization of the door 202 relative to the fixed door-frame structure 120 may prevent vertical movement (e.g., upward and/or downward movement) of the door 202 which the combination of unreinforced door 202, door hinges 208, and door latch 210 may be unable to prevent under certain loading conditions such as a 3-g peak upward acceleration (e.g., when the aircraft 100 (FIG. 1) is flying through turbulence) and/or a 6-g peak downward acceleration as may occur in the event of an emergency landing condition.

Advantageously, the ability to mount the deployable seat 236 on a door 202 of a monument 132 (FIG. 4) such as a lavatory door 202 instead of the conventional mounting location on a partition or monument wall 134 (FIG. 4) increases the total amount of floor space available for passenger seats 113 (FIG. 2). For example, implementation of the presently-disclosed seat system 200 on the lavatory 136 (FIG. 4) doors 202 (FIG. 4) at the aft end of an aircraft cabin 112 (FIG. 2) of a twin-aisle commercial aircraft 100 (e.g., FIG. 2) may result in the ability to add 2-4 passenger seats 113 to the cabin layout which may result in an increase in airline revenues. Depending upon the cabin layout, the ability to mount the seat systems 200 (FIG. 3) on the lavatory doors 202 may provide the ability for seated flight attendants to directly view passengers in the main aisles 114 (FIG. 2) as may be required for aircraft certification. Furthermore, the presently-disclosed seat system 200 may provide for more efficient use of cabin space and may improve the aesthetics of the cabin interior.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A seat system, comprising:
  a door including a locking mechanism, the door being movable between an open position and a closed position;
  a seat mounted to the door and including a seat bottom movable between a stowed position and a deployed position; and
  the locking mechanism operatively coupled to the seat bottom and configured such that movement of the seat bottom from the stowed position to the deployed position when the door is in the closed position causes the locking mechanism to engage fixed door-frame structure located adjacent the door and to immobilize the door against movement from the closed position, and movement of the seat bottom from the deployed position to the stowed position causes the locking mechanism to disengage from the fixed door-frame structure and to allow the door to be moved from the closed position.

2. The seat system of claim 1, wherein:
  the locking mechanism is at least one of mechanically-actuated and electrically-actuated in response to movement of the seat bottom to the deployed position when the door is in the closed position.

3. The seat system of claim 1, wherein:
  the locking mechanism includes a plurality of translatable pins extendable from a door edge into engagement with the fixed door-frame structure.

4. The seat system of claim 1, wherein:
  the locking mechanism includes at least one cam mounted to the seat bottom and connected to at least one translatable pin by a connecting rod; and
  the at least one cam moving with the seat bottom between the stowed position and the deployed position causing the locking mechanism to respectively disengage and engage with the fixed door-frame structure.

5. The seat system of claim 1, wherein:
  the fixed door-frame structure comprises at least one of a door threshold and a seat track included with a floor of a vehicle.

6. The seat system of claim 1, wherein:
  the fixed door-frame structure comprises a door sill mounted above a door upper portion.

7. The seat system of claim 1, wherein:
  the locking mechanism includes a structural frame coupled to the door and configured to transfer at least one of lateral loads and vertical loads from the seat to the locking mechanism.

8. The seat system of claim 7, wherein:
  the locking mechanism and structural frame are configured to support at least one of lateral loads and vertical loads imposed on the door by a mass of an occupant seated on the seat bottom.

9. The seat system of claim 1, wherein:
  the door is a door in an interior of a vehicle.

10. The seat system of claim 9, wherein:
  the vehicle is an aircraft cabin having at least one main aisle; and
  the seat being generally aligned with the main aisle.

11. The seat system of claim 9, wherein:
  the seat facing in one of a forward direction and an aft direction relative to a direction of forward motion of the vehicle when the door is in the closed position.

12. An aircraft including a cabin having a lavatory, comprising:
- a lavatory door including a locking mechanism and movable between an open position and a closed position;
- a seat mounted to the lavatory door and including a seat bottom having a folding mechanism allowing movement of the seat bottom between a stowed position and a deployed position; and
- the locking mechanism operatively coupled to the seat bottom and configured such that movement of the seat bottom from the stowed position to the deployed position when the lavatory door is in the closed position causes the locking mechanism to engage fixed door-frame structure located adjacent the lavatory door and to immobilize the lavatory door against movement from the closed position, and movement of the seat bottom from the deployed position to the stowed position causes the locking mechanism to disengage from the fixed door-frame structure and to allow the lavatory door to be moved from the closed position.

13. A method of supporting a seat mounted to a door, comprising the steps of:
- moving a seat bottom of a door-mounted seat to a deployed position with the door in a closed position;
- engaging a locking mechanism of the door to a fixed door-frame structure located adjacent to the door in response to moving the seat bottom to the deployed position; and
- immobilizing the door against movement in response to engagement of the locking mechanism to the fixed door-frame structure.

14. The method of claim 13, further including:
- transferring, using the locking mechanism, a structural load from the seat to the fixed door-frame structure.

15. The method of claim 14, wherein the locking mechanism includes a structural frame coupled to the door, the step of transferring the structural load from the seat to the fixed door-frame structure includes:
- transferring the structural load from the seat into the structural frame;
- transferring the structural load from the structural frame to the locking mechanism; and
- transferring the structural load from the locking mechanism to the fixed door-frame structure.

16. The method of claim 14, wherein the step of transferring the structural load includes:
- transferring at least one of lateral loads and vertical loads into the fixed door-frame structure.

17. The method of claim 13, wherein the step of engaging the locking mechanism of the door to the fixed door-frame structure includes:
- at least one of mechanically actuating and electrically actuating the locking mechanism into engagement with the fixed door-frame structure upon movement of the seat bottom to the deployed position.

18. The method of claim 13, wherein the step of engaging the locking mechanism of the door to the fixed door-frame structure includes:
- extending one or more translatable pins from a door upper portion into a door sill mounted above the door upper portion.

19. The method of claim 13, wherein the step of engaging the locking mechanism of the door to the fixed door-frame structure includes:
- extending one or more translatable pins from a door lower portion into at least one of a door threshold and a seat track included with a floor of a vehicle.

20. The method of claim 13, wherein the seat bottom includes at least one cam mounted on at least one of opposing seat sides, the cam coupled to a translatable pin using a connecting rod, the step of engaging the locking mechanism of the door to the fixed door-frame structure including:
- rotating the cam with movement of the seat bottom to the deployed position; and
- extending the translatable pin into the fixed door-frame structure in response to rotating the cam.

* * * * *